US006626512B2

(12) United States Patent
Bloomberg (10) Patent No.: US 6,626,512 B2
(45) Date of Patent: Sep. 30, 2003

(54) SINGLE PASS PRINTING OF TEXT AMONG INTERLEAVED PRINTING OF NON-TEXT MATERIAL

(75) Inventor: Steven Jay Bloomberg, Madison, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/101,781

(22) Filed: Mar. 19, 2002

(65) Prior Publication Data

US 2002/0097287 A1 Jul. 25, 2002

Related U.S. Application Data

(62) Division of application No. 09/732,160, filed on Dec. 7, 2000.

(51) Int. Cl.[7] .................................................. B41J 2/205
(52) U.S. Cl. ............................ 347/15; 347/43; 347/1.9
(58) Field of Search ........................ 347/15, 43; 358/1.2, 358/1.9, 502, 521, 534

(56) References Cited

U.S. PATENT DOCUMENTS

| | | | |
|---|---|---|---|
| 4,728,968 A | 3/1988 | Hillmann et al. | 347/43 |
| 4,833,491 A | 5/1989 | Rezanka | 347/43 |
| 5,243,292 A | 9/1993 | Borton et al. | 324/458 |
| 5,683,188 A | 11/1997 | Miyazaki et al. | 347/42 |
| 5,950,040 A | 9/1999 | Mestha et al. | 399/46 |
| 6,134,025 A | * 10/2000 | Takeuchi et al. | 358/1.2 |
| 6,179,403 B1 | 1/2001 | Xie et al. | 347/23 |
| 6,209,985 B1 | 4/2001 | Minamizawa | 347/40 |

* cited by examiner

Primary Examiner—Lamson Nguyen
(74) Attorney, Agent, or Firm—Perman & Green, LLP (57) ABSTRACT

A method of printing a subject on a medium by use of a printing device including a printhead assembly, wherein the printhead assembly has at least one printhead having an array of marking elements, is accomplished by scanning the printhead assembly along a medium by a succession of passes, the passes being offset from each other in a direction transverse to a scanning movement of the printhead assembly relative to the medium. The subject consists of textual and non-textual material, and pixels of the subject are loaded into the printing device. The method provides for separating pixels of the textual material from pixels of the non-textual material, and printing pixels of at least a portion of the subject by passing the printhead along the medium in a plurality of the passes. In an offsetting of successive ones of the passes, a translation of the printhead in the transverse direction accumulated over the succession of the plurality of passes does not exceed a transverse dimension of the printhead. Non-textual material of the subject is printed in more than one of the plurality of the passes, and textual material of the subject is printed during only one of the plurality of the passes. Examination of print command signals may be made to alter printing protocol based on the presence or absence of color or black.

2 Claims, 7 Drawing Sheets

SINGLE PASS PRINTING OF TEXT AMONG INTERLEAVED PRINTING OF NON-TEXT MATERIAL

This application is a Divisional of application Ser. No. 09/732,160, filed Dec. 7, 2000.

BACKGROUND OF THE INVENTION

This invention relates to printing of both text and non-text (graphics) material in printing apparatus employing an array of sources of media marking elements, such as ink jets, and particularly to the activation of the marking elements to optimize the quality of printed text and printed non-text material.

Various types of printing devices are known for printing markings on a print medium. Of particular interest herein is a printing device employing a linear array of printing elements constituting a printhead which moves along the medium in a direction perpendicular to the linear array. In one well-known form of such printing device, two printheads are joined together in a unitary print-head assembly wherein one of the linear arrays comprises color marking elements, such as inkjets, while the second linear array comprises black marking elements, such as inkjets. For example, the first printhead may comprise a linear array of inkjets wherein some of the inkjets employ yellow ink, some of the inkjets employ magenta ink, and the remainder of the inkjets employ cyan ink. In the second printhead, all of the inkjets employ black ink. In a typical printing task, both of the printheads may be employed in presenting a graphic subject such as scenery having multiple colors and black, while only the second printhead is employed for printing black text within the subject imprinted on the medium.

In one typical form of construction of the color printhead, the inkjets are grouped together by color. For example, the inkjets may be arranged in a yellow band, a magenta band, and a cyan band. In order to provide an interleaving of the swaths of color laid down on the medium during successive passes of the printhead assembly across the medium, it is common practice to advance the medium, transversely to the direction of head movement, by a distance of one-half the width of a color swath for improved print quality. This has been found to minimize the effect of possible variations in the spraying patterns of successive ones of the color inkjets. Also, it has also been the practice, in the operation of a printhead, to employ some form of randomizing in the activation of the various ones of the inkjets during successive ones of the passes of the printhead assembly so as to obtain improved uniformity in the printing of regions,of the subject matter.

In the foregoing technique for interleaving the swaths of color laid down by the inkjets in a printhead, a problem arises in that this technique introduces a lack of clarity in lettering or text wherein the edge lines of each printed character are not as sharply defined as is desirable.

SUMMARY OF THE INVENTION

The aforementioned problem is overcome and other advantages are provided, in accordance with the practice of the invention, by implementation of a printing mode wherein the printing of text is separated from the printing of non-text material. To facilitate description of the invention, in accordance with a first embodiment of the invention, it is presumed that the text is printed with black ink by a single print head (the black printhead) while the non-textual material may include both color and black, wherein the color is printed by use of a separate printhead (the color printhead) having inkjets operative with magenta, yellow and cyan inks. A single printhead assembly carries both printheads. The black text, in a region of the medium, is printed solely within a single pass of a printhead laying down solely black ink across the region of the medium while more than one pass is provided for the color printhead to lay down colored inks in the same region of the medium. The printing of the black text is accomplished independently of the interleaving and randomizing of the various colors and black components of the non-textual subject matter.

As a matter of convenience in the implementation of the invention, the black textual material may be imprinted simultaneously with the printing of black non-textual material subject to the proviso that while a plurality of passes of the printhead assembly may be employed for printing black markings over a band of subject matter equal in width to the length of the black inkjet array, only one pass of the plurality of passes of the printhead assembly is employed for the printing of the textual material. Thereby, the printing of the textual material is free from the foregoing interleaving and randomizing procedures for the printing of non-textual subject matter such as scenery on the medium. As a result, the textual material is provided with clearly shaped characters, such as alphanumeric characters, these characters being superposed upon the graphical, non-textual, portions of the subject matter.

If the text were to be printed in a color such as magenta, by way of example, rather than in black, then, in accordance with the first embodiment of the invention, a separate printhead would be used for the magenta rather than for the black. Alternatively, in accordance with a second embodiment of the invention, the principle of printing the text in a single pass of the printhead is applied to the color printhead such that, in the foregoing example of magenta, non-textual or graphic material would be printed in more than one pass of the color printhead across a region of the medium while the textual material would be printed solely within a single pass of the color printhead across that region of the medium.

In a further feature of the invention, there is examination of binary digital pixel signals that are fed to the inkjets to produce the image on the medium. These pixel signals are one bit signals that serve as print command signals for directing the respective inkjets to print a mark or to leave a blank space on the medium. As a result of the examination of the pixel signals, the printing protocol may be altered, based on the presence or absence of color or black. This is accomplished efficiently by concurrent examination of print command signals of individual ones of a plurality of color and black signals by use of an OR function to search for a color or black print command signal. Such information may be used to speed up the printing process by deleting extra passes of the printhead assembly employed for the foregoing interleaving in the situation, wherein only one of the foregoing colors is to be employed.

In the ensuing description, the principles of the invention will be described first with respect to the first embodiment of the invention, with a printing of text in black ink.

BRIEF DESCRIPTION OF THE DRAWING

The aforementioned aspects and other features of the invention are explained in the following description, taken in connection with the accompanying drawing figures wherein:

FIG. 5 comprises FIGS. 5A and 5B presenting timing diagrams showing operation of the circuitry of FIG. 4 in accordance with the first and second embodiments, respectively, of the invention.

Identically labeled elements appearing in different ones of the figures refer to the same element but may not be referenced in the description for all figures.

DETAILED DESCRIPTION OF THE INVENTION

Figure 1:
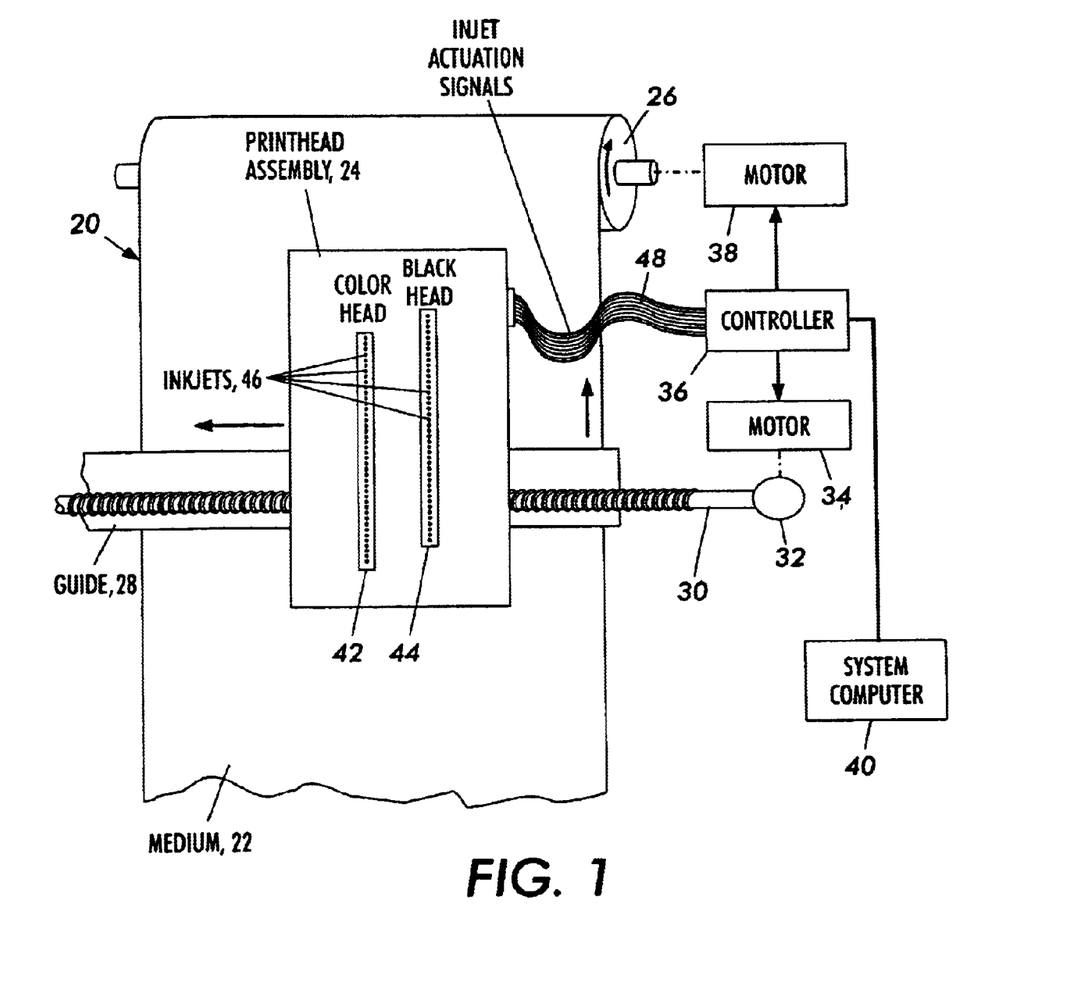
FIG. 1 shows a stylized fragmentary view of a printer, partially in diagrammatic form, operative in accordance with the method of the invention.

FIG. 1 shows a printer 20 having a medium 22 for receiving marks imprinted thereon by a printhead assembly 24, the medium 22 being in the form of a sheet carried by a plurality of rolls 26, only one of the rolls 26 being shown to simplify the drawing. The printhead assembly 24 travels along a guide 28 which supports the printhead assembly 24 during subsequent passes of the printhead assembly 24 in a transverse direction across the medium 22 for imprinting successive lines of a subject on the medium 22. Transverse movement of the printhead assembly 24 is controlled by a cable 30 which is moved by a rotatable pulley about which the cable 30 is wrapped. The pulley 32 is rotated by a motor 34 operative under control of electric signals applied thereto by a controller 36. The controller 36 also applies electric signals to a further motor 38 which rotates the roll 26 for transporting the medium 22 in a longitudinal direction, perpendicular to the transverse direction of passage of the printhead assembly 24. The controller 36 is controlled, in turn, by electric signals applied thereto by a system computer 40.

The invention is applicable to printhead assemblies having various arrangements of printheads. In a preferred embodiment of printer employed for carrying out of the method of the invention, the printhead assembly 24 has two printheads 42 and 44. The printhead 42 includes a linear array of inkjets 46 oriented perpendicularly to the direction of movement of the printhead assembly 24, wherein differing ones of the inkjets 46 carry different colors of ink. The printhead 44 also includes a linear array of inkjets 46 disposed parallel to the color array of inkjets of the printhead 42, and being offset from the printhead 42 in the longitudinal direction of travel of the medium 22. The inkjets 46 of the black printhead 44 carry black ink for printing black portions of subject matter, and also for printing black text within the subject matter. Electric signals for operating the inkjets 46 of both of the printheads 42 and 44 are provided by the controller 36 via an electric cable 48 interconnecting the controller 36 with the printhead assembly 24. The offsetting of the black printhead 44 relative to the color printhead 42 provides for improved interleaving of markings imprinted via respective ones of the printheads 42 and 44 for improved rendition of the printing of the subject matter.

Figure 2:
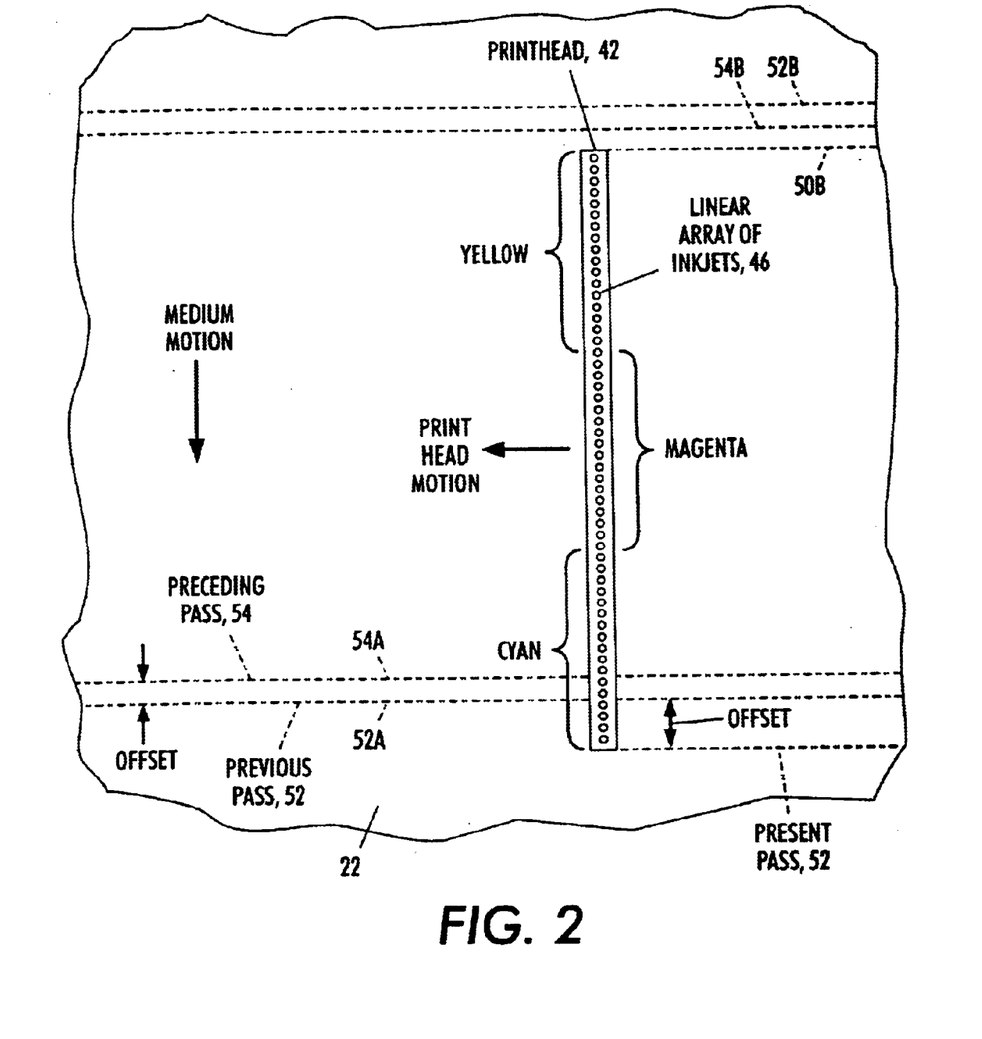
FIG. 2 shows a path of travel of a printhead of the printer of FIG. 1 traveling across the medium for receiving printing.

With reference to FIG. 2, there are shown details in the construction and operation of the color printhead 42. The printhead 44 is not shown in FIG. 2 to simplify the drawing, it being understood that, apart from the use of black ink instead of colored ink, the operation of the printhead 44 is the same as that of the printhead 42. By way of example in the construction of the color printhead 42, there are approximately 320 of the inkjets 46 arranged in a linear array of which approximately the first 100 inkjets at the top of the printhead carry yellow ink, approximately 100 inkjets in the middle of the printhead carry magenta ink, and approximately 100 inkjets at the bottom of the printhead carry cyan ink. Between the group, or sub-array, of yellow inkjets and the group of the magenta inkjets, there are a few inkjets which are unused and, also, between the group of magenta inkjets and the group of cyan inkjets, there are a few inkjets which are unused. Thus, the inkjets may be viewed as being arranged in three sub-arrays of equal width and differing color. The width of each color band is approximately equal to one third of the length of the array of the inkjets of the color printhead 42. The unused inkjets provide improved separation of the colors to be imprinted on the medium 22. Arrows in the figure show the transverse movement of the printhead 42 towards the left during a printing operation, and the downward movement of the medium 22 between the successive passes of the printhead 42. The present pass traversed by the printhead 42, a previous pass, and the pass before the previous pass are shown at 50, 52 and 54. The bottom edges of the passes are indicated at 50A, 52A and 54A, while the top edges of these passes are indicated at 50B, 52B and 54B, respectively. The offsets between successive ones of the passes 50, 52 and 54 are equal to each other, and are equal to one-sixth the total length of the array of the inkjets 46 of the printhead 42, and also of the printhead 44 (not shown in FIG. 2). Thus, the width of the offset is equal to one-half the width of one of the foregoing color bands.

Figure 3:
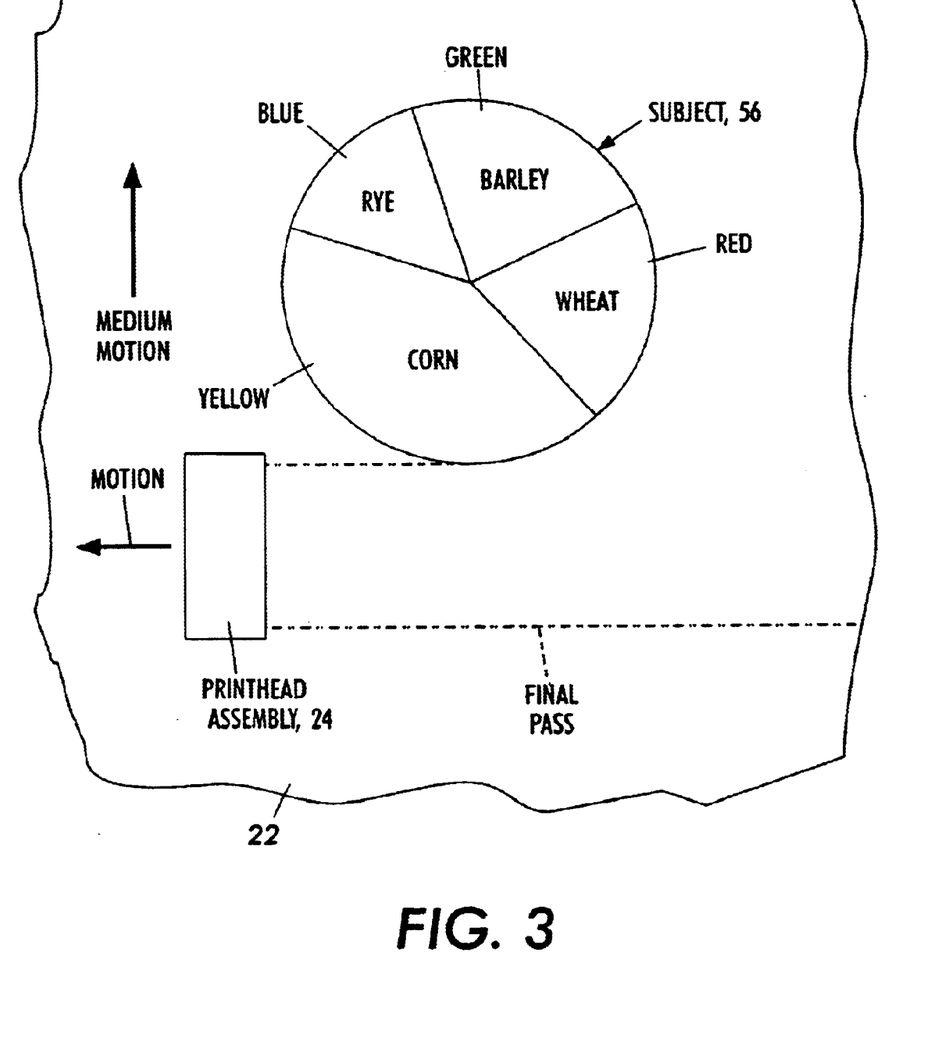
FIG. 3 shows an imprinting of subject matter on the medium by a printhead assembly of the printer of FIG. 1 wherein the subject matter includes regions of different color with black text superposed upon the color.

FIG. 3 provides an example of a subject 56 being printed on the medium 22 by the printhead assembly 24. The subject 56 is a graphical representation of the production of produce showing a yellow region imprinted with text, namely, the word "CORN", and blue, green and red regions imprinted respectively with the words RYE, BARLEY and WHEAT. In each printing pass of the printhead assembly 24, various ones of the inkjets 46 (FIG. 2) are activated to provide for coloring various ones of the pixels of the subject 56, with specific ones of the passes in the sequence of passes being designated for imprinting the text in accordance with the practice of the invention. This is accomplished by separating the colors to be imprinted at the sites of various ones of the pixels along with a separation of black non-textual material and a separation of the black textual material from the colors.

Figure 4:
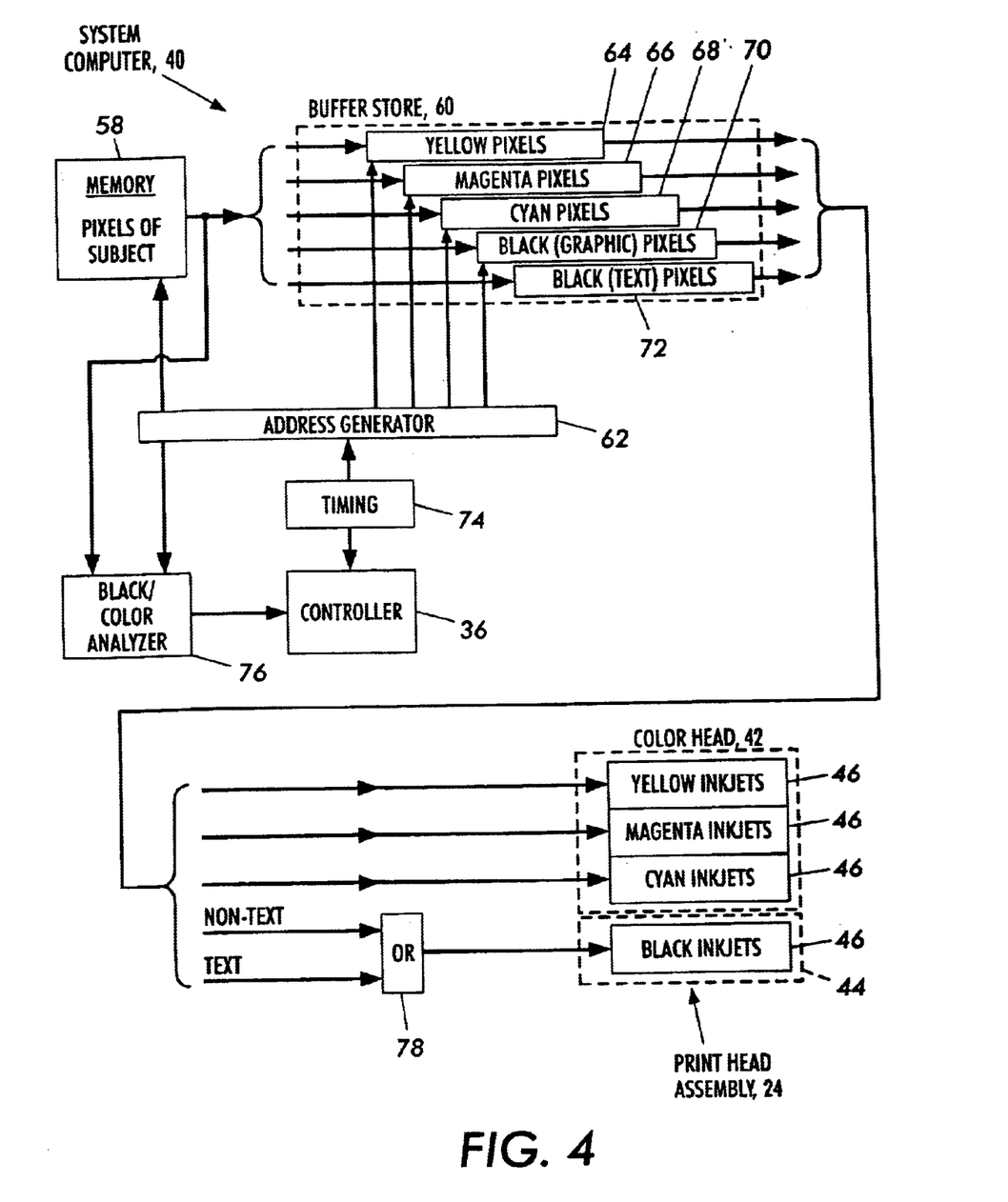
FIG. 4 is a block diagram showing a portion of the host computer of FIG. 1 providing for the separation of the colored, black and textual portions of pixels of the subject being imprinted on the medium, in accordance with a first embodiment of the invention.

FIG. 4 shows details in the construction of the system computer 40 to accomplish the foregoing separation of the colors and the black material to be imprinted at the sites of various ones of the pixels. The system computer 40 includes a memory 58, and a buffer store 60 which receives signals read out of the memory 58 under control of an address generator 62. The buffer store 60 includes registers 64, 66, 68, 70 and 72 operative in response to clocking and address signals from the address generator 62. The register 64 receives information regarding the imprinting of yellow at the sites of various ones of the pixels, with the registers 66 and 68 receiving corresponding information with respect to the imprinting of magenta and cyan at the sites of respective ones of the pixels. Black non-textual information for respective ones of the pixels is read out of the memory 58 to the registers 70, with textual black material being read out of the memory 58 to the register 72. The address generator 62 is responsive to timing signals from a timing unit 74, the timing unit 74 providing signals also for synchronizing operation of the controller 36 with the address generator 62. A black/color analyzer 76 may also be connected with the output on the memory 58, an output of the address generator 62, and an input of the controller 36 for operation of the controller 36 in accordance with the detection of colored and black regions of the subject 56 (FIG. 3) in accordance with a further feature of the invention.

Figure 5A:
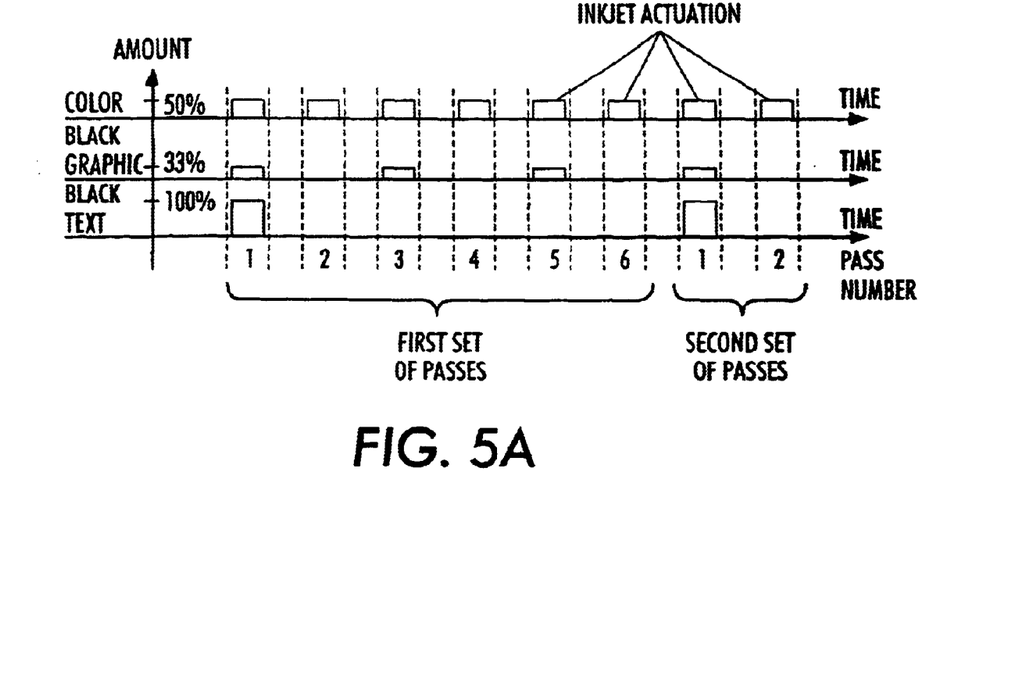

Output ports of the registers 64, 66 and 68 apply control signals to various ones of the inkjets 46 of the color printhead 42 such that the signals of the register 64 are coupled to those inkjets carrying yellow ink, the signals of the register 66 are coupled to those inkjets carrying magenta ink, and the signals of the register 68 are coupled to those inkjets carrying cyan ink. The signals outputted by the registers 70 and 72 are applied via an OR circuit 78 to the printhead 44 for control of the inkjets 46 carrying the black ink. With the arrangement of the circuitry shown in FIG. 4, the address generator 62 has individual control of the times of imprinting the various colors and black at each of the sites of the various pixels of the subject 56 to be printed, which printing can take place in a pseudo-random fashion, or other manner as may be desirable for blending the printing of successive ones of the passes of the printhead assembly 24 and for reducing the effect of any misalignment in the locations of the various inkjets 46 of the printhead 42 and 44. Such improvement in rendition of the printed subject is accomplished in accordance with the invention by a sequencing of the printing stages of the various passes of the printhead assembly 24 as is described with reference to the timing diagram of FIG. 5.

With respect to the timing diagram FIG. 5, it is noted that the printhead assembly 24 makes a sequence of six passes across the printer medium 22. During this sequence of six passes, the medium 22 advances a distance equal to the length of the array of the inkjets 46 of the printhead 42 which, in turn, is equal to the length of the array of the inkjets 46 of the printhead 44. As shown in the first graph of the timing diagram, color is imprinted at only 50 percent of the maximum amount of color which can be applied in a region to be colored. However, all of the requisite color for any one of the color bands can be printed within two passes of the printhead assembly 24 because the offset between successive passes of the printhead assembly 24 is equal to half the width of the band of color, as has been described above. Accordingly, an imprinting of all three of the colors, in all three of the color bands, is accomplished in a total of six passes of the printhead assembly 24. This is shown in the first graph of the timing diagram wherein the color is laid down on the medium at a rate of 50 percent of capacity during each of the six successive passes of a printing cycle. Therefore, in the printing process, the printhead assembly 24 cycles through a set of six passes across the medium 22, after which a new cycle begins, the cyclical procedure continuing until all of the subject matter has been printed.

The second graph of the timing diagram shows the procedure for printing black non-textual material by use of the inkjets 46 of the black printhead 44. All of the inkjets 46 of the black printhead 44 are employed for the printing of the black non-textual material. Since there are six passes of the printhead assembly 24 during each of the printing cycles, the black material may be imprinted at a rate of one third of total capacity, as shown in the second graph, wherein the printing occurs on alternate ones of the passes, such as pass No. 1, pass No. 3 and pass No. 5 depicted in the timing diagram. Alternatively, in accordance with the practice of the invention, the printing can be done at a rate of one sixth of capacity with printing in every pass of the printing cycle. By printing in either alternate passes or in every pass of the printing cycle, there is good interleaving of a printing of the successive passes for a high quality rendition of the subject.

The third graph of the timing diagram depicts a feature of the invention wherein all of the text is printed with the black ink by the inkjets 46 of the black printhead 44 in a single pass of the printing cycle. Thus, 100 percent of the textual material is printed in a single pass, shown as pass No. 1, of the printing cycle. Here, no attempt is made to interleave text among successive passes of the printing cycle but, in accordance with the practice of the invention, the completed printing in a single pass with availability of all of the black inkjets produces more clearly defined and precisely configured printed characters on the print medium 22. In particular, the edge lines of the alphanumeric characters are more sharply defined by imprinting all of the textual material at 100 percent of capacity within a single pass of the printing cycle.

By way of alternative embodiments of the invention, it is noted that text could be printed in a color, such as magenta, yellow or cyan, by way of example, instead of in black. In such case, if desired, the printhead 44 (FIG. 1) could carry inkjets filled with ink of the desired color for imprinting the text, and the printhead 42 could carry inkjets filled with inks having the remaining colors and black. The foregoing description of the operation of the printer 20 would still apply, except that the ink of the selected color would be interchanged with the black ink.

However, preferably, the printing of text in color would be accomplished by use of the color printhead 42, in accordance with a further embodiment of the invention, without replacing the black inkjets 46 of the black printhead 44 with color inkjets 46 from the color printhead 42. This further embodiment of the invention enables the printing of the text in color to be accomplished by use of color inkjets 46 of the color printhead 42 in a manner which enhances the print quality similarly to the enhancement of the print quality by the first embodiment of the invention.

In order to understand the theory of the second embodiment of the invention, if is useful to recall that, in the first embodiment of the invention, the printhead assembly 24 makes a sequence of six passes across the printer medium 22 and that, during this sequence of six passes, textual material is printed during only one of the passes. Furthermore, during the cyclical sequence of the six passes, the medium 22 advances a distance equal to the length of the array of the inkjets 46 of the black printhead 44 which prints the textual material.

In analogous fashion, printing of colored text, in accordance with the second embodiment of the invention, is accomplished by use of the array of color inkjets comprising the individual smaller arrays of the respective yellow, magenta and cyan inkjets. As has been described above, each of the individual arrays of color inkjets is approximately one-third the length of the array of the black inkjets of the black printhead 44. Thus, in the foregoing cyclical sequence of six passes, a region of the medium 22 would be passed over by the array of yellow inkjets (or other ones of the colored inkjets) in only two passes for the imprinting of yellow marks in graphical subject matter. Only one of these two passes is to be employed for the imprinting of yellow textual material.

The next two passes would be available for imprinting further color marks into the graphical subject matter such as magenta marks. If the textual material is to have a magenta component, then one of these two passes would be employed for the imprinting of the magenta textual material. Similarly, in the final two passes of the cyclical sequence of passes, cyan marks would be printed in the same region the medium 22 in the event that there is to be a cyan component in the graphical subject material. However, only one of these two passes would be employed for printing cyan in the textual subject matter.

Figure 5B:
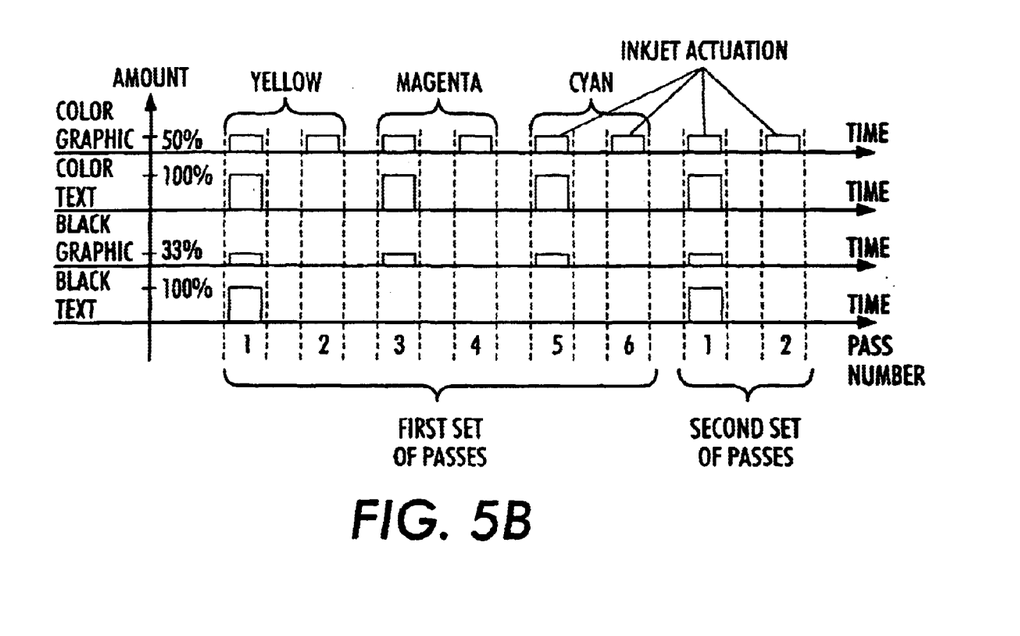

The foregoing operation of the second embodiment of the invention is depicted in the first two graphs of FIG. 5B, wherein the first graph shows that, in each of the passes in the cyclical sequence of six passes, there is an imprinting of color marks by actuation of the inkjets 46 of the color printhead 42. Since two passes are employed for laying down all of the cyan, or other color, for the graphical subject matter in a region of the medium 22, the colors are laid down at a rate of 50 percent of a maximum rate in any one pass. This provides a full amount of any one color component of the graphical subject matter in two successive passes of the color printhead 42. On the other hand, as shown in the second graph of FIG. 5B, since the textual material is imprinted for any one of the colors in only one of the two passes, the coloring is applied at the full rate of 100 percent. In the event that black ink is to be laid down on the medium, along with color ink, for the printing of the graphic and/or textual material, the procedure for such usage of black ink remains the same as has been described above for the printing of black text and graphic material, such printing being depicted in the bottom two graphs of both FIGS. 5A and 5B.

The first graph of FIG. 5B also identifies the color of ink to be printed during the respective passes in the cyclic sequence of the six passes of a color printhead 42. In the event that one of these colors is not required, such as the yellow of pass No. 2 or the magenta of pass No. 4 by way of example, then the controller 36 (FIGS. 1 and 4) is able to speed up the printing process by deleting this pass of the printhead assembly 24, and by advancing the medium 22 by an extra increment of the width of one pass before directing the printhead assembly 24 to do any printing.

Figure 4A:
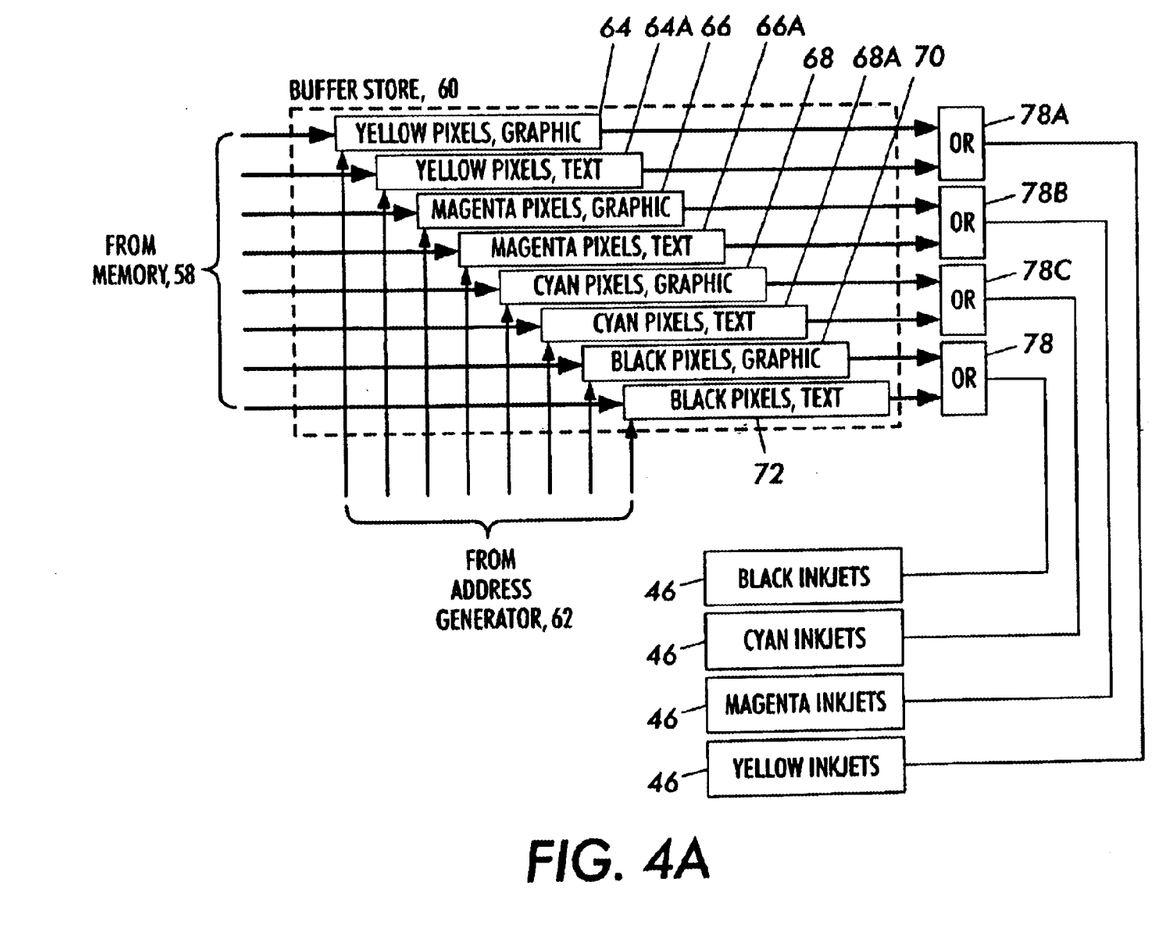
FIG. 4A shows a portion of FIG. 4 modified in accordance with a second embodiment of the invention.

The second embodiment of the invention is readily accomplished by modifying the system computer 40, as depicted in FIG. 4, by enlarging the number of registers of the buffer store 60, and the inclusion of additional OR circuits as shown in FIG. 4A. The additional registers are identified as registers 64A, 66A and 68A for storing, respectively, the yellow text pixels, the magenta text pixels, and the cyan text pixels. The additional OR circuits comprise the OR circuit 78A for the yellow pixels, the OR circuit 78B for the magenta pixels, and the OR circuit 78C for the cyan pixels.

The operation of the circuitry in FIG. 4A follows that described above with reference to the circuitry of FIG. 4. Thus, data is read out of the memory 58, in response to signals of the address generator 62, to be stored in respective ones of the registers of the buffer store 60, and to be read out from these registers in response to signals applied to the registers from the address generator 62. The signals read out of the registers are applied to the respective ones of the inkjets 46 in the respective arrays of the inkjets in accordance with a procedure analogous to the procedure described above for the reading out of the data of black graphic pixels of the register 70 and the black text pixels of the register 72 via the OR circuit 78 to the black inkjets 46.

In accordance with the timing of the operation of the colored-ink inkjets, as set forth in FIG. 5B, the address generator 62 is responsive to the timing unit 74 for directing the register 64 to read out yellow graphic pixels via the OR circuit 78A to the yellow inkjets 46 at times designated in the first graph of FIG. 5B, and also for directing the register 64A to read out yellow text pixels via the OR circuit 78A to the yellow inkjets 46 at times designated in the second graph of FIG. 5B. Similar comments apply to the reading out of the magenta graphic pixels and the magenta text pixels respectively from the registers 66 and 66A via the OR circuit 78B for activating the magenta inkjets, and to the reading out of the cyan graphic pixels and the cyan text pixels respectively from the registers 68 and 68A via the OR circuit 78C for activating the cyan inkjets.

Figure 6:
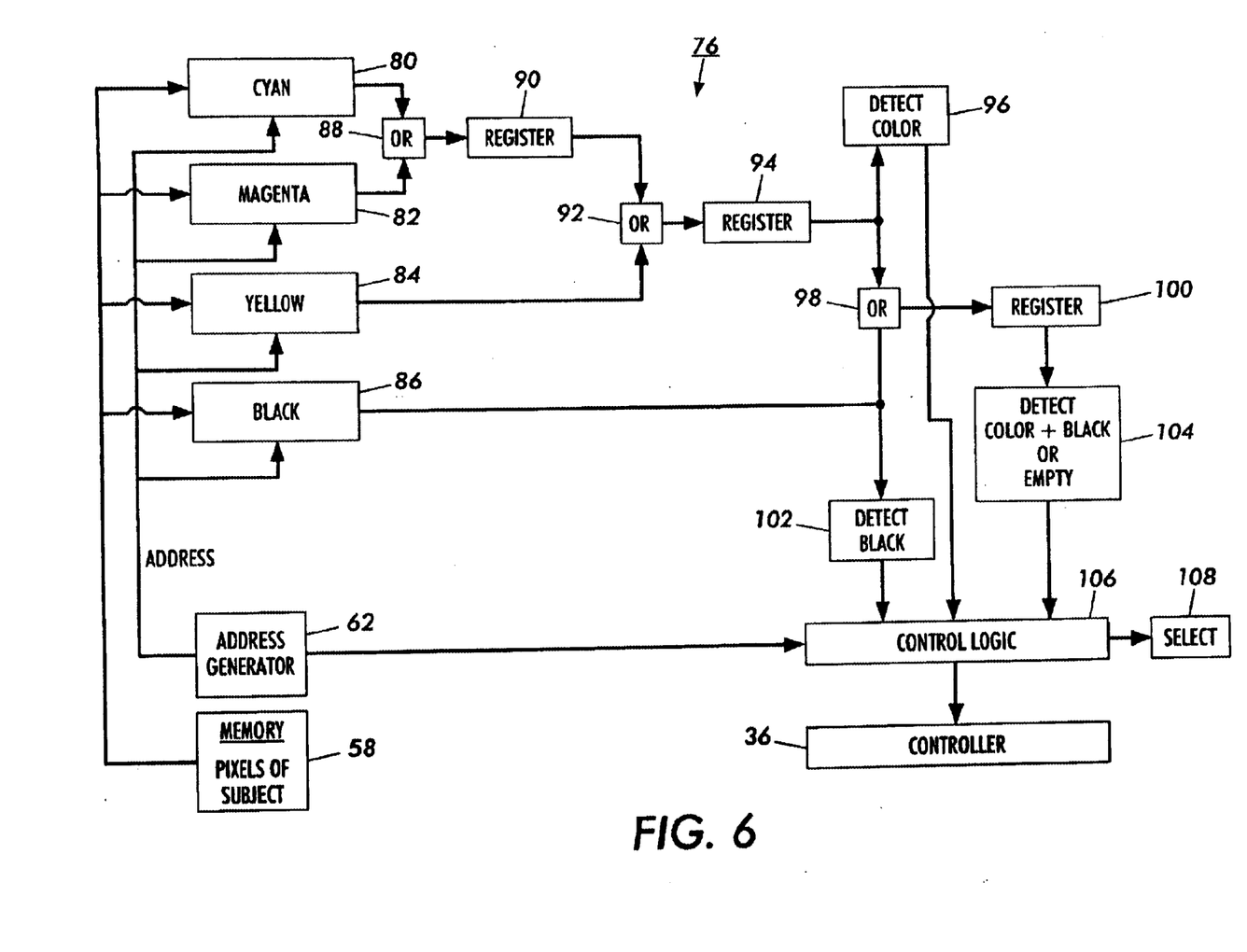
FIG. 6 is a block diagram of a black/color analyzer of FIG. 4.

With reference to FIG. 6, and in accordance with a further feature of the invention, the analyzer 76, shown also in FIG. 4, comprises four registers 80, 82, 84 and 86 for storing information with respect to, respectively, the cyan, the magenta, the yellow, and the black to be imprinted on the medium 22 in the printing of the subject 56 (FIG. 3). The registers 80, 82, 84 and 86 are addressed by signals from the address generator 62 and receive information from the memory 58 with respect to the pixels of the subject. The address generator 62 and the memory 58 are shown also in FIG. 4. For the printing of any one of the colors, such as cyan, at the site of a pixel, it is necessary to provide only a one-bit signal to indicate the presence or absence of a dot of cyan to be printed on the medium 22. Thus, the register 80 stores a lengthy series of digits, one for each pixel in a line of pixels to be printed, wherein the presence of a logic 1 or a logic 0 indicates the presence or absence of the color cyan at the respective pixels and serves as a command signal for an inkjet. In similar fashion, each of the registers 82, 84 and 86 stores a series of digits wherein a logic 1 or a logic 0 indicates the presence or absence of the magenta, the yellow, or the black to be imprinted at the respective pixels.

In the operation of the analyzer 76, the presence of color in the subject is indicated by the detection of a logic-1 signal in any one of the registers 80, 82 and 84. To determine whether color is to be present at a specific portion of the subject, the invention provides for a gathering of logic-1 signals of the three colors in the three registers 80, 82 and 84 prior to a detecting of the presence of a logic-1 signal. This is accomplished by performing an OR operation on the digital signals stored in the registers 80, 82 and 84. Instead of performing the OR operation on a digit by digit basis, which is costly in terms of time, the OR operation is performed on segments or bytes, such as 32 bits, of the data to provide for a much faster determination of the presence of color. The bits in each of the registers 80, 82 and 84 are addressed by the address generator 62. An OR circuit 88 operates on signals, such as the foregoing example of a segment of 32 bits, outputted by the registers 80 and 82 and stores the result of the OR operation in a register 90. A further OR circuit 92 operates on the contents of the register 90 and the register 84 and outputs the results of the OR operation in a register 94. The presence of a logic 1 in either of the registers 80 and 82 appears also in the register 90 and, similarly, the presence of a logic 1 in either of the registers 90 and 84 appears in the register 94. Thereby, the register 94 has gathered the logic-1 signals of all of the color registers 80, 82 and 84. The presence of the logic-1 signal and, hence, the presence of color, is detected at the register 94 by a detector 96.

A further OR circuit 98 operates upon the contents of the register 94 and the register 86 and outputs the results of the OR operation in a register 100. The contents of the register 100 indicate the presence of both color and/or black in the subject being printed. Also included in the analyzer 76 are two more detectors 102 and 104, and a control logic unit 106. The detector 102 detects the presence of a logic-1 signal in the bits of the byte addressed by the generator 62 in the register 86. The presence of the logic-1 signal indicates that there is black in the subject matter while the absence of the logic-1 signal indicates the absence of black in the portion of the subject matter represented by the bits of the byte addressed by the generator 62. The detector 104 detects the presence of a logic-1 signal in the register 100, this representing the presence of either color or black or both color and black at the locations of the pixels of the 32-bit set of addresses applied by the generator 62 to the registers 80, 82, 84 and 86. The absence of the logic-1 signal is an indication that the field of the subject matter represented by the foregoing set of addresses is empty in terms of an absence of color and an absence of black.

The results of the detections of the detectors 96, 102 and 104 are applied to the control logic unit 106 which is operative, in response to a user mode selection at 108, to direct the address generator 62 to provide addresses for examining for the presence of color or black or color and black at a smaller region of the subject matter, or to continue looking at some other region of the subject matter for this information. By way of example in the use of the control unit 106, in the absence of color, the unit 106 may direct the controller 36 (shown also in FIG. 4) to print text during one pass of the printing cycle, and then to advance the medium 22 by a displacement equivalent to the displacement of a complete printing cycle. Further information in the construction and utilization of a printer operable in plural modes involving color with black, and black only, is disclosed in copending application (Ser. No.: 09/349,025, Inventor: Bloomberg, S., Filing date: Jul. 7, 1999), the contents of which are incorporated herein by reference. As has been explained above, such displacement is equal to the length of the array of inkjets 46 of the black printhead 44. Thereby, by altering the printing protocol in terms of the number of printing passes in the cycle of printing passes to be employed for printing a portion of the subject, this feature of the invention provides for a much more rapid printing of the subject matter and eliminates the interleaving of bands of color when no color is to the printed.

The functions of the circuitry of the analyzer 76 can be implemented by use of a computer, and the benefits of the analyzer 76 are available for other purposes in addition to the foregoing purpose of selecting an operating mode of the printer 20. For example, the analyzer 76 may be used to identify regions of an image having only color but no black, or the absence of either color or black, by way of example.

Thus, the analyzer 76 is operative generally as a tool in image analysis.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A method for identifying the presence of a logic state in a set of binary digital signals, the set of binary digital signals being suitable for characterizing a region of an image in terms of coloration, comprising steps of:

selecting groups of the signals by address;

examining the addressed signals to determine the presence of a first of two logic states, said examining being performed by processing groups of multiple ones of the signals concurrently by use of an OR function among groups of the signals for each of respective ones of characteristics of coloration; wherein the respective signal groups represent respective components of the coloration, the first of the two logic states designates the presence of a color component in a pixel of the image, and an outputting by the OR function of the first of the two logic states shows the presence of color in at least one of a plurality of the signal groups; and detecting, in an output of the OR function, a signal having the first logic state, a location of the signal in the region being known by the address of the signal.

2. A method for identifying the presence of a logic state in a set of binary digital signals, the set of binary digital signals being suitable for characterizing a region of an image in terms of coloration, comprising steps of:

selecting groups of the signals by address;

examining the addressed signals to determine the presence of a first of two logic states, said examining being performed by processing groups of multiple ones of the signals concurrently by use of an OR function among groups of the signals for each of respective ones of characteristics of coloration;

detecting, in an output of the OR function, a signal having the first logic state, a location of the signal in the region being known by the address of the signal;

changing a size of the region to a second region of smaller size; and repeating the steps of selecting, examining, and detecting for such ones of the signals as are found within the second region.

* * * * *